Figure 1:
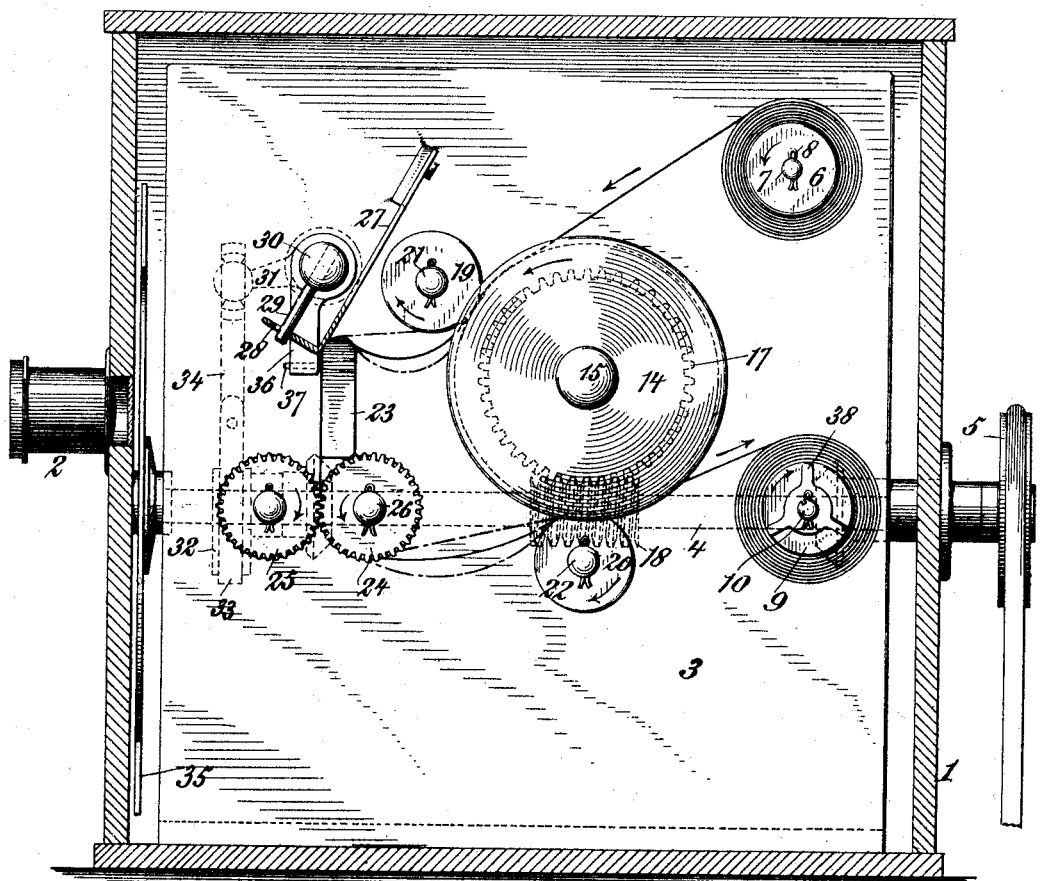

No. 629,063. Patented July 18, 1899.
H. CASLER.
KINETOGRAPHIC CAMERA.
(Application filed Feb. 26, 1898.)

(No Model.) 3 Sheets—Sheet 1.

Fig.1,

WITNESSES: INVENTOR

No. 629,063. Patented July 18, 1899.
H. CASLER.
KINETOGRAPHIC CAMERA.
(Application filed Feb. 26, 1896.)
(No Model.) 3 Sheets—Sheet 3.

WITNESSES:

INVENTOR
Herman Casler
BY
E. M. Marble & Sons
ATTORNEYS

UNITED STATES PATENT OFFICE.

HERMAN CASLER, OF CANASTOTA, NEW YORK, ASSIGNOR TO THE AMERICAN MUTOSCOPE COMPANY, OF NEW YORK, N. Y.

KINETOGRAPHIC CAMERA.

SPECIFICATION forming part of Letters Patent No. 629,063, dated July 18, 1899.

Application filed February 26, 1896. Serial No. 580,811. (No model.)

*To all whom it may concern:*

Be it known that I, HERMAN CASLER, a citizen of the United States, residing at Canastota, in the county of Madison and State of New York, have invented a new and useful Improvement in Consecutive-View Apparatus; and I do hereby declare the following to be a full, clear, and exact description of the invention, such as will enable others skilled in the art to which it appertains to make and use the same.

My invention relates generally to consecutive-view apparatus and to strip or film feeding mechanism therefor, and particularly to photographic cameras employed for taking a rapid succession of views of objects in motion, from which the movements of said objects may be reproduced to the eye by means of a suitable apparatus; and my invention is particularly intended for the taking of pictures to be used in the instrument for reproducing the movements of objects from a succession of views thereof for which Letters Patent No. 549,309 were issued to me on November 5, 1895, or to be used in the other instrument for reproducing the movements of objects upon a screen for which I filed an application for Letters Patent of even date herewith, Serial No. 580,810.

Cameras heretofore devised for the taking of rapid successions of views of moving objects have been defective in that they have been incapable of taking pictures as large as is desirable or of giving sufficiently long exposure to each picture to enable photographs to be taken under ordinary conditions of illumination. In these cameras photographs are taken in a long flexible sensitive film, successive portions of which are moved into the field of a lens and held stationary while a shutter is opened to permit light passing through the lens to act upon the film. In order that the ordinary movements of objects may be satisfactorily reproduced, it is necessary that the series of views from which these movements are reproduced shall have been taken at about the rate of forty a second. While the shutter is open and the light is acting upon the film the portion of the film exposed to the light must be stationary, so that it is necessary to feed the film intermittently. If in order to produce the desired intermittent feeding of the film the movement of the entire film carrying and feeding mechanism be checked for each exposure, the vibration set up in the camera by the sudden stoppage of the rapidly-moving parts of the mechanism prevents a distinct picture from being obtained or makes it necessary that the shutter shall be opened each time for so brief a time that adequate exposure of the film is not obtained. If the spools from which the unexposed film is unwound and upon which the exposed film is wound are permitted to revolve continuously, while other mechanism, which feeds and guides the film across the field of the lens, is caused to move intermittently, stopping each time before the shutter is opened and commencing to move again after the shutter is closed, although by this means the weight of the intermittently moving parts is greatly reduced, it is still found that the sudden starting and stopping of these parts of the mechanism cause troublesome vibrations, which reduce greatly the time during which the shutter may be opened, and also that the intermittently-moving film-feeding mechanism is incapable of moving with sufficient rapidity and of feeding the film sufficiently rapidly to bring more than a very short length of fresh film into the field of the lens without setting up excessive vibration. These difficulties I have overcome in the camera herein described by causing all of the parts of the film-feeding mechanism to revolve continuously and uniformly, a catch being used to hold the film stationary while the shutter is open and the film-feeding rolls being permitted to slip over the film while the film is held by the catch. This catch is extremely light and easily moved, and its operation causes no vibration. All of the parts of the mechanism which carry or feed the film revolve continuously and uniformly, and therefore their operation causes no jar or vibration of the camera.

The above constitutes a most important feature and advantage of my camera and is its most characteristic feature. Other advantages I will hereinafter point out.

My invention consists in the novel means employed for intermittently feeding the film across the field of the lens, in the novel means employed for rendering the feeding of the film uniform, in the novel means employed for marking the film to permit exact registry of prints made therefrom, in the novel means employed for reeling up the film after exposure and preventing the accumulation of unreeled film in the camera, and in the novel combination, construction, and arrangement of the parts of the apparatus.

The objects of my invention are, first, to provide a camera for taking a rapid succession of views of moving objects which shall be capable of taking larger views and of giving longer exposures than the devices for similar purposes heretofore used; second, to provide a film or strip feeding mechanism capable of the intermittent feeding of longer lengths of film than has been practicable with the film-feeding mechanisms heretofore used and which shall be free from jar and vibration in its operation; third, to provide a film or strip feeding mechanism which shall not require previous perforation or other special preparation of the film and which shall not be liable to failure in operation owing to the slipping of the film; fourth, to provide a film or strip feeding mechanism which shall not wear, tear, or otherwise injure the film; fifth, to provide means for marking the film at the time and place of each exposure and to facilitate the bringing into registry of prints made from the film when the different views are to be mounted separately; sixth, to provide means for reeling up the film which shall prevent accumulation of loose film within the camera, and, seventh, to make the camera simple in construction, compact, portable, and easy of operation. These objects are attained in the camera herein described and illustrated in the drawings which accompany and form a part of this application, in which the same reference-numerals indicate the same or corresponding parts, and in which—

Figure 2:
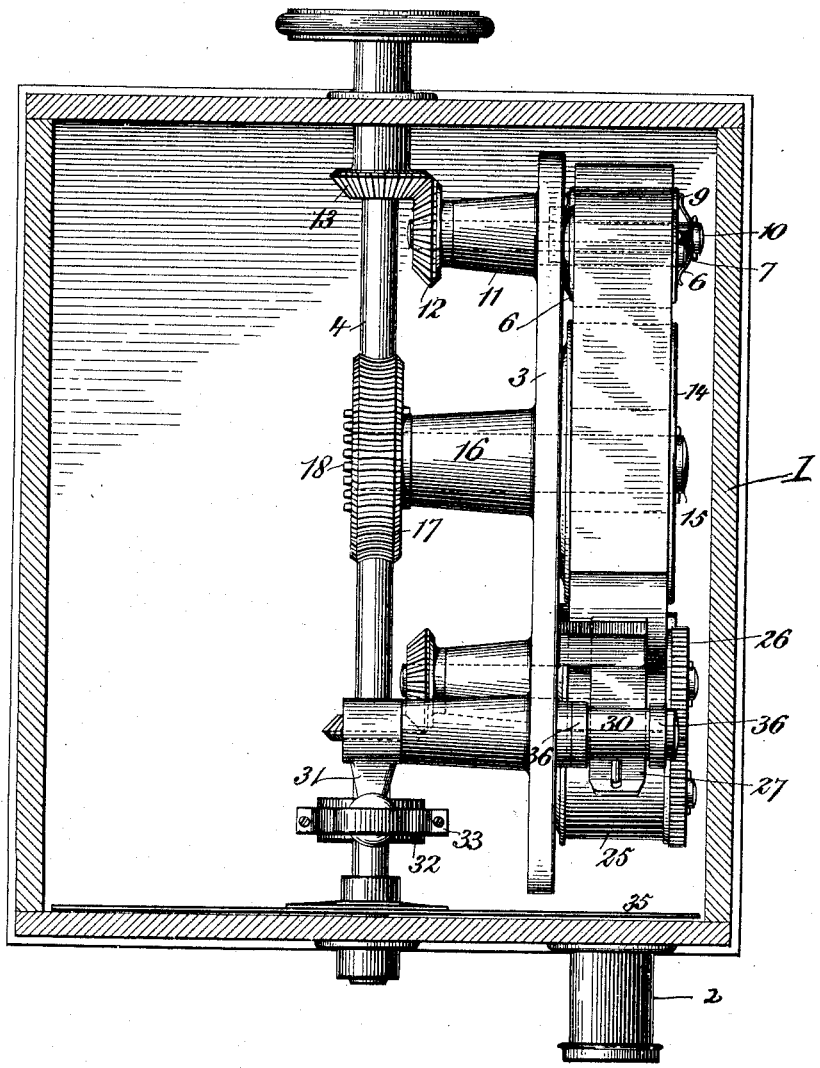
Figure 3:
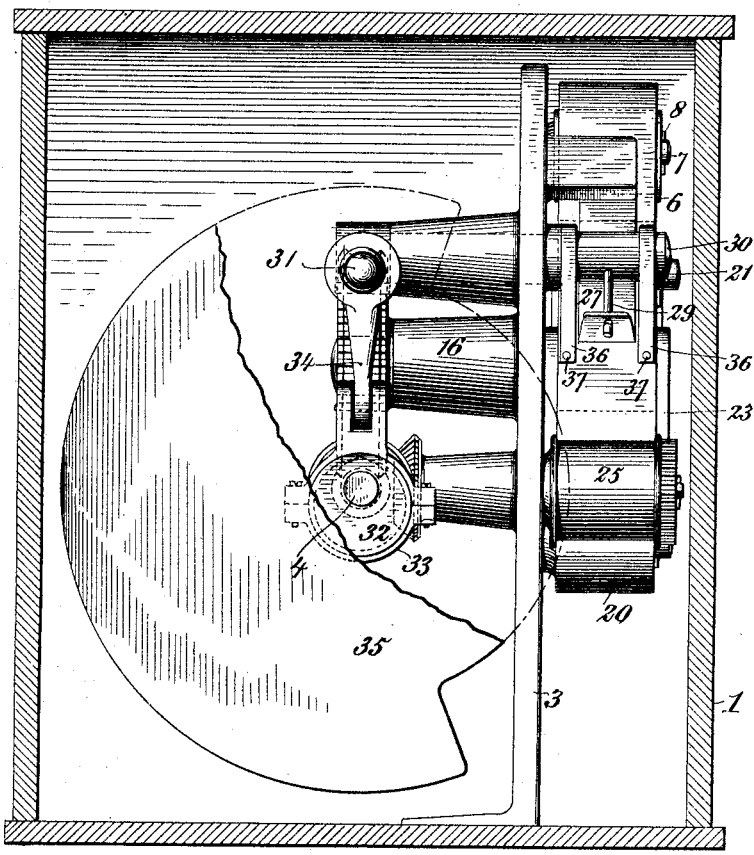

Figure 1 is a side view of the camera, the side of the inclosing case having been removed. Fig. 2 is a plan view of the camera, the top of the inclosing case having been removed; and Fig. 3 is a front view of the camera, the front of the inclosing case having been removed and a portion of the shutter-disk having been broken away.

In the drawings, 1 is the inclosing case of the camera.

2 is the lens, attached to the front of the case 1, and 3 is a vertical frame-plate secured at the bottom to the bottom of the case 1, which supports the film carrying and feeding mechanism.

4 is the driving-shaft of the camera. It is mounted in bearings in the case 1, and one end projects outside of the case and carries a pulley 5, by which it may be driven from a motor or other source of power.

6 is a spool carrying the strip of sensitive film upon which the photographs are to be taken. It is mounted to revolve upon a spindle 7, projecting from the frame-plate 3, and a spool from which the film has been unwound may be removed and a loaded spool placed on the spindle by removing the cotter-pin 8.

9 is a spool upon which the exposed film is wound. It is mounted upon a shaft 10, which is revolubly mounted in a bearing within a boss 11 of the frame-plate 3 and is driven from the driving-shaft 4 by bevel-gears 12 and 13. The spool 9 and shaft 10 are rotatably connected by a friction device hereinafter described.

14 is the main film-feeding drum. It is secured to a shaft 15, having a bearing in a boss 16 of the frame-plate 3, and is driven from the shaft 4 by a worm-wheel 17 and worm 18. Two small idle rolls 19 and 20 are mounted upon spindles 21 and 22 with their surfaces in contact with or in close proximity to the surface of the drum 14. These rollers are loose upon their spindles and are driven only by friction with the drum 14 or the film-strip interposed between the rollers and the drum. They serve to hold the film in contact with the surface of the drum. They are preferably composed of or have their surfaces covered with some yielding and elastic substance, so that possible injury to the film may be avoided.

23 is a plate secured to and projecting at right angles to the frame-plate 3 and located in the focal plane of the lens, which forms a support for the film during exposure and while the film is being punched, as hereinafter described.

24 and 25 are auxiliary film-feeding rolls, the function of which is to remove the exposed section of film and bring a fresh portion of the film into the field of the lens after each exposure. They are geared to revolve together at the same rate of speed, and roller 24 is mounted upon a shaft 26, having its bearing in the frame-plate 3 and driven by bevel-gears from the driving-shaft 4. These rolls feed the film forward intermittently, the film being held and prevented from feeding across the plate 23 during about one-half of the revolution of the shutter-disk by the catch hereinafter mentioned, during which time the rolls slip idly over the film. Since they act only intermittently and must during the time of their action feed forward as much film as has been fed forward by the drum 14 and roller 19 during a complete revolution of the shutter-disk, they are arranged to revolve at twice or more than twice the peripheral speed of the disk 14.

27 is a flat spring secured at one end to the frame-plate 3, the other end being arranged to press the film-strip against the top of the backing-plate 23. This spring forms the catch by which the film is held stationary in the field of the lens during exposure. Its free end is upturned and is provided with a slot 28, in which works a pin 29, secured to a revolubly-mounted rock-shaft 30, having bearings in the frame-plate 3. The rock-shaft projects through the frame-plate and upon the rear side thereof carries an arm 31, which is directly over the shaft 4. Upon the shaft 4 is an eccentric 32, and the eccentric-strap 33 is connected to the arm 31 by an eccentric-rod 34, having a hinged connection with the eccentric-strap and a universal-joint connection with the arm 31. When the shaft 4 revolves, the rock-shaft 30 is caused to vibrate. The amplitude of this vibration is sufficient to cause the pin 29 to engage with the outer edge of the slot 28 each time and lift the spring 27 clear of the film and hold it so during the time the shutter of the camera is closed.

35 is the shutter-disk, by which the admission of light to the film is controlled. It is a thin disk mounted upon and secured to the driving-shaft 4 and situated just in rear of the lens. A portion of its periphery is cut away, so as to leave the lens uncovered during a portion of the revolution of the disk, and thus to permit the passage of light to the film. When the different views or prints made from the negative strip produced by this camera are to be mounted separately, as in the exhibition device shown and described in my above-mentioned patent, No. 549,309, it is necessary that some means shall be used for marking the position of each view on the strip or film accurately, so that the views of the prints made from the strip may be registered accurately when subsequently mounted separately. The marking of the film for this purpose I effect by punching two holes in the film each time a new length of film is fed forward. Upon the rock-shaft 30, upon either side of the pin 29, is mounted an arm 36, carrying a punch 37, which is arranged to punch a hole through the film each time the shaft 30 vibrates. The plate 23 is perforated to permit the punchings to escape. The holes thus punched are punched each time at the instant when the exposure is made and are always in precisely the same position with respect to the center of the view. In printing from the negative strip made in the camera after the pictures thereon have been developed a sensitized strip upon which the positives are to be printed is first run through the camera or through a similar punching mechanism, so as to have the holes punched at the same distance as are the holes in the negative strip. When the positive and negative strips are placed in the printing-frame for printing, the registration-holes are kept in registry while printing is going on by means of dowels or similar devices.

In preparing the camera for operation a strip of film is first placed in position by opening the side of the case 1, which exposes to view the mechanism, placing a spool of film on the spindle 7, and carrying the end of the film between the drum 14 and roller 19, over the plate 23 and under the catch 27, between the auxiliary feed-rolls 24 and 25, between the drum 14 and roller 20, and to the winding-spool 9, to which it is secured. The side of the case 1 is then closed, a loop being left between rollers 24 and 25 and rollers 14 and 20, and the camera is in readiness for operation.

In the drawings the parts of the mechanism are shown in the position occupied when the shutter is open and the exposure half completed. The spring or stop 27 is holding the film stationary against the top of the backing-plate 23. The drum 14 is rotating in the direction of the arrow shown in Fig. 1, drawing film from the spool 6, which collects in a loop between the drum and the plate 23, since the film is not being fed forward across the plate 23. A loop of exposed film, which has previously been formed, as will be seen hereinafter, between the auxiliary feed-rolls 24 and 25 and the drum 14, is being taken up through the feeding forward of the film by the drum 14 and roller 20, and the film thus fed forward is wound upon the rotating spool 9. As the shaft 4 rotates the edge of the shutter-disk 35 cuts off light from the lens. At the instant light is cut off the pin 29, moving upward, lifts the spring 27, thus releasing the film. The auxiliary feed-rolls 24 and 25 during the time that the shutter is open simply slip over the film, but are unable to feed it forward, because it is held by the spring 27; but when this spring has released the film the rolls 24 and 25 instantly feed it forward. These rolls move at twice the peripheral speed of the drum 14, as above stated. Therefore during the time the light is cut off they feed as much film across the plate 23 as has been fed into the loop between the drum 14 and plate 23 during a complete revolution of the shutter. The loop of film between the drum 14 and plate 23 is taken up, therefore, during the time that the shutter is closed, the extra film in this loop corresponding to the length of film required for a new exposure. At the same time another and corresponding loop is formed between the auxiliary feed-rolls 24 and 25 and the drum 14, since the film is fed onward much faster by the rolls 24 and 25 than it is taken up by the drum 14 and roll 20. Further rotation of the shaft 4 causes the shutter to open. Just before the shutter opens the spring 27, which has been descending with the pin 29, touches the film and holds it stationary against the plate 23. The auxiliary feed-rolls, being no longer able to move the film, slip over its surface. As soon as the shutter opens exposure begins and continues so long as the shutter is open—that is, during about half the revolution of the shutter-disk. The rock-shaft 30 still continues to move after the spring 27 has reached the film on the plate 23, and by its further movement causes the punches 37 to punch holes through the film, as above explained. These punches are withdrawn by the backward movement of the rock-shaft 30 before the pin 29 lifts the spring 27 and releases the film.

It will be noted that all of the parts of the mechanism except the spring 27 and the rock-shaft 30 and parts connected therewith have a continuous uniform rotary motion, and therefore no jar or vibration results from their motion. The spring 27 and the rock-shaft 30 and the parts connected therewith are so small and light, have such small amplitudes of movement, and are so firmly supported that no jar results from their movement.

The drum 14 and roller 19 are placed as close as possible to the plate 23, as are the auxiliary feed-rolls 24 and 25, so that the length of film set in motion by the rolls 24 and 25 may be as small as possible. This is done so that the film may start to feed across the plate 23 promptly when released by the spring 27 and also to avoid the danger of tearing of the film, which results when a considerable length of film is started into motion suddenly.

In practice in order to avoid any danger of the gradual accumulation of film in the loop between the drum 14 and the plate 23, due to possible slipping of the film between the auxiliary feed-rolls 24 and 25, I gear these rolls to revolve somewhat faster than would be theoretically required—that is, in the machine shown in the drawings to revolve with somewhat more than twice the peripheral speed of the drum 14—so that each time that the film is fed forward by the rolls 24 and 25 the loop between the plate 23 and the drum 14 is entirely taken up. In order to provide for the gradual increase in diameter of the spool 9, upon which the exposed film is wound, which tends to cause the spool to take up the film more and more rapidly, the spool is not directly connected to its shaft 10, but is mounted loosely upon it, while the legs of a tripod-shaped spring-washer 38, itself so secured to the shaft 10 as to be caused to revolve therewith, press against the spool 9 and cause it to revolve by frictional contact. When the film between the spool 9 and the drum 14 is tight, however, the spool will slip somewhat with respect to the shaft 10 and washer 38. All of the feeding-rolls revolve continuously and uniformly, and therefore when the film is to be fed across the field of the lens it is never necessary to overcome the inertia of any of the parts of the apparatus, only the inertia of a very short section of the film requiring to be overcome. It is therefore possible to feed a considerable length of film across the plate 23 in a brief time allotted for that purpose. As shown in the drawings, the shutter-disk is arranged to admit light during nearly one-half of its revolution. If desired, the shutter may be arranged to be open a much greater portion of the revolution than one-half, all that is required being the cutting away of a greater portion of the periphery of the shutter, a proportionate increase in the peripheral speed of the auxiliary feed-rolls 24 and 25 with respect to the speed of the drum 14, and an adjustment of the amplitude of movement and of position of the pin 29, so that the spring 27 may be released and lifted at the proper time; and because of the lightness of the parts and of the fact that all of the parts which have directly to do with the feeding of the film move continuously, as does the great body of the film, a much higher speed of the rolls 24 and 25 is well within the limits of the machine. In this manner the time allowed for each exposure may be considerably increased.

It will be noted that the greater portion of the work of feeding the film—viz., the drawing of the film from the roll 6—is done by the drum 14 and that the rolls 24 and 25 are required to feed only a very short and loosely-held length of film, so that their hold on the film is very light and no injury results to the film because of the slipping of these rolls upon it.

Having thus completely described my invention, what I claim, and desire to secure by Letters Patent, is—

1. In a consecutive-view apparatus, the combination, with a supply-spool carrying a strip, a winding-spool upon which the strip may be wound, a main feeding-drum arranged to deliver the strip from said supply-spool and to carry it to the winding-spool, and means for holding the strip in contact with the surface of said drum, of continuously-moving auxiliary feed-rolls having a higher peripheral velocity than said drum, acting upon the strip by frictional contact, and arranged to feed the strip across the field of the apparatus, an intermittently-operating catch arranged to grasp the strip intermittently and thereby to prevent the feeding of the strip across the field of the apparatus, thereby causing the auxiliary feed-rolls to slip thereon, a shutter arranged to cut off light from the strip while the same is moving in the field of the apparatus, and means for synchronously operating the shutter and catch, substantially as described.

2. In a consecutive-view apparatus, the combination, with a lens, and film-feeding devices arranged to feed a strip of sensitive film across the field of said lens intermittently, of a shutter arranged to cut off light from the film while the same is moving in the field of the lens, means for synchronously operating the shutter and film-feeding mechanism, and a marking device, arranged to mark the position of each view upon the film, and operated each time the film-feeding mechanism operates, substantially as described.

3. In a consecutive-view apparatus, the combination, with a lens, and continuously-moving film-feeding devices arranged to feed a strip of sensitive film across the field of the lens, of an intermittently-operating catch arranged to grasp the film intermittently, thereby momentarily preventing the feeding of the film across the field of the lens, a shutter arranged to cut off light from the film while the same is moving in the field of the lens, means for synchronously operating the shutter and catch, and a marking device, arranged to mark the position of each view upon the film, and operated each time the catch operates to hold the film, substantially as described.

4. In a consecutive-view apparatus, the combination, with a lens, and continuously-moving film-feeding devices arranged to feed a strip of sensitive film across the field of said lens, of an intermittently-operating catch arranged to grasp the film intermittently, thereby momentarily preventing the feeding of the film across the field of the lens, a shutter arranged to cut off light from the film while the same is moving in the field of the lens, means for synchronously operating the shutter and catch, and a punch operated synchronously with the shutter and catch, and arranged to mark the position of each view on the film, substantially as described.

5. In a consecutive-view apparatus, the combination, with a shutter arranged to interrupt the passage of light, and a continuously-moving driving-shaft arranged to operate said shutter, of a strip-feeding mechanism arranged to feed a flexible strip through the field of the apparatus, and comprising a main driving-drum, for delivering and carrying off the strip, driven from said shaft, means for holding the strip in contact with said drum on the delivery and take-off sides thereof, auxiliary feed-rolls driven from said driving-shaft and at a higher peripheral speed than said main driving-drum, and arranged to feed the strip across the field of the apparatus by frictional contact, and a catch arranged to grasp the strip and to prevent it from being fed across said field, and operated by said driving-shaft intermittently and synchronously with the shutter.

6. In a consecutive-view apparatus, the combination, with a shutter arranged to interrupt the passage of light, and a continuously-moving driving-shaft arranged to operate said shutter, of a strip-feeding mechanism arranged to feed a flexible strip through the field of the apparatus, and comprising a main driving-drum, for delivering and carrying off the strip, driven from said driving-shaft, means for holding the strip in contact with said drum on the delivery and take-off sides thereof, a winding-spool frictionally driven from said driving-shaft and tending to revolve at a higher peripheral velocity than said main driving-drum, continuously-moving auxiliary feed-rolls likewise driven from said driving-shaft and at a higher peripheral speed than said main driving-drum, and arranged to feed the strip across the field of the apparatus by frictional contact, and a catch arranged to grasp the strip and to prevent it from being fed across said field, and operated by said driving-shaft intermittently and synchronously with the shutter.

7. In a consecutive-view apparatus, the combination, with a lens, a shutter arranged to interrupt the passage of light from said lens, and a continuously-moving driving-shaft arranged to operate said shutter, of continuously-moving feed-rolls driven from said driving-shaft for feeding a flexible strip of sensitive film across the field of the lens, and acting upon said strip by frictional contact, a plate for supporting said strip in the field of the lens, a spring arranged to press said strip against said plate and so to prevent the feeding thereof, a rock-shaft carrying an arm engaging said spring arranged to lift the same, means, operated by the driving-shaft for vibrating said rock-shaft synchronously with the operation of the shutter, thereby causing said spring to release the strip when the shutter is closed, and a punch, operated by said rock-shaft, and arranged to punch registration-holes in said strip each time the same is held by said spring, substantially as described.

In testimony whereof I affix my signature in presence of two witnesses.

HERMAN CASLER.

Witnesses:
 A. A. SCHENCK,
 K. F. CASSIDY.